(12) United States Patent
Holstine et al.

(10) Patent No.: US 11,655,040 B2
(45) Date of Patent: May 23, 2023

(54) DUAL FUNCTION ARM SWITCH AND MODE SELECT SYSTEM FOR EJECTION SYSTEMS

(71) Applicant: AMI INDUSTRIES, INC., Colorado Springs, CO (US)

(72) Inventors: Steve Holstine, Colorado Springs, CO (US); Mayur Kali Vadhwana, Colorado Springs, CO (US)

(73) Assignee: AMI Industries, Inc., Colorado Springs, CO (US)

( * ) Notice: Subject to any disclaimer, the term of this patent is extended or adjusted under 35 U.S.C. 154(b) by 312 days.

(21) Appl. No.: 17/152,434

(22) Filed: Jan. 19, 2021

(65) Prior Publication Data
US 2022/0227496 A1 Jul. 21, 2022

(51) Int. Cl.
*B64D 25/10* (2006.01)
*B60N 2/427* (2006.01)

(52) U.S. Cl.
CPC ......... *B64D 25/10* (2013.01); *B60N 2/42781* (2013.01)

(58) Field of Classification Search
CPC ........ B64C 1/32; B64D 25/10; B60N 2/42781
See application file for complete search history.

(56) References Cited

U.S. PATENT DOCUMENTS

| | | | |
|---|---|---|---|
| 3,633,852 A * | 1/1972 | Forman ................. | B64D 25/10 244/122 A |
| 4,290,568 A * | 9/1981 | Vollmoeller .......... | B64D 25/10 244/122 A |
| 4,673,147 A * | 6/1987 | Solomonides ......... | B64D 25/10 244/122 A |
| 4,911,382 A * | 3/1990 | Aronne ................. | B64D 25/10 307/118 |
| 10,384,788 B2 | 8/2019 | Campbell et al. | |
| 2017/0297725 A1 * | 10/2017 | Campbell .............. | B64D 25/10 |

FOREIGN PATENT DOCUMENTS

CN  201355433  12/2009

OTHER PUBLICATIONS

European Patent Office, European Search Report dated May 27, 2022 in Application No. 22150225.5.

* cited by examiner

*Primary Examiner* — Justin M Benedik
(74) *Attorney, Agent, or Firm* — Snell & Wilmer L.L.P.

(57) ABSTRACT

A dual switch arm and mode select system for monitoring an ejection mode selection of an ejection system may include a controller. An ejection mode selector, a first arm switch assembly, a second arm switch assembly, and a display may be in communication with the controller. The controller may determine an ejection mode of the ejection system based on a signal received from the ejection mode selector. The controller may determine a position of the first arm switch assembly and a position of the second arm switch assembly. The controller may command the display to output at least one of a fault-free signal, a fault signal, or a warning signal based on the ejection mode and the positions of the first arm switch assembly and the second arm switch assembly.

20 Claims, 8 Drawing Sheets

DUAL FUNCTION ARM SWITCH AND MODE SELECT SYSTEM FOR EJECTION SYSTEMS

FIELD

The present disclosure relates to aircraft ejection systems and, more particularly, to a dual function arm switch and mode select system.

BACKGROUND

Ejection systems are designed to expel ejection seats and their occupants from an aircraft. Some aircraft include a two-seat ejection system, wherein a pilot ejection seat and a co-pilot ejection seat are expelled from the aircraft. Current two-seat ejection systems generally include an ejection mode select system, which allows a flight crew member to manually select which ejection seats will be ejected upon deployment of the ejection system and whether initiation of the eject sequence by the co-pilot ejection seat will also initiate deployment of the pilot ejection seat. An incorrect ejection mode selection can lead to injury and/or death if an ejection seat is not ejected before impact. An incorrect ejection mode selection can also lead to loss of the aircraft if the pilot is inadvertently ejected from the aircraft.

SUMMARY

Disclosed herein is a dual switch arm and mode select system for monitoring an ejection mode selection of an ejection system. In accordance with various embodiments, the dual switch arm and mode select system may comprise a controller and an ejection mode selector in communication with the controller. A first arm switch assembly may be in communication with the controller. The first arm switch assembly may be configured to translate between a safe position and an armed position. A second arm switch assembly may be in communication with the controller. The second arm switch assembly may be configured to translate between the safe position and the armed position. A display may be in communication with the controller. A tangible, non-transitory medium may be configured to communicate with the controller. The tangible, non-transitory medium has instructions stored thereon that, in response to execution by the controller, cause the controller to perform operations, which may comprise determining, by the controller, an ejection mode of the ejection system based on a signal received from the ejection mode selector; determining, by the controller, a position of the first arm switch assembly; determining, by the controller, a position of the second arm switch assembly; and commanding, by the controller, the display to output at least one of a fault-free signal, a fault signal, or a warning signal based on the ejection mode, the position of the first arm switch assembly, and the position of the second arm switch assembly.

In various embodiments, the ejection mode may comprise at least one of a solo mode, a dual mode, or a pilot command mode.

In various embodiments, the controller may be configured to command a first indicator of the display to output the fault-free signal in response to the controller determining the ejection mode is the solo mode, the first arm switch assembly is in the armed position, and the second arm switch assembly is in the safe position. The controller may be configured to command the first indicator of the display to output the fault signal in response to the controller determining the ejection mode is the solo mode and at least one of the first arm switch assembly is in the safe position or the second arm switch assembly is in the armed position.

In various embodiments, the controller may be configured to command a second indicator of the display to output the warning signal in response to the controller determining the ejection mode is the dual mode, the first arm switch assembly is in the armed position, and the second arm switch assembly is in the armed position. The controller may be configured to command the second indicator of the display to output the fault signal in response to the controller determining the ejection mode is the dual mode and at least one of the first arm switch assembly or the second arm switch assembly is in the safe position.

In various embodiments, the controller may be configured to command a third indicator of the display to output the warning signal in response to the controller determining the ejection mode is the pilot command mode, the first arm switch assembly is in the armed position, and the second arm switch assembly is in the armed position. The controller may be configured to command the third indicator of the display to output the fault signal in response to the controller determining the ejection mode is the pilot command mode and at least one of the first arm switch assembly or the second arm switch assembly is in the safe position.

In various embodiments, the controller may be configured to command a first seat indicator of the display to output an armed signal in response to the controller determining the first arm switch assembly is in the armed position. The controller may be configured to command a second seat indicator of the display to output the armed signal in response to the controller determining the second arm switch assembly is in the armed position.

In various embodiments, the first arm switch assembly may comprise a lever and a circuit assembly. The circuit assembly may be configured to output an arm switch position signal to the controller. In various embodiments, determining, by the controller, the position of the first arm switch assembly may comprise receiving, by the controller, the arm switch position signal, from the circuit assembly; and determining, by the controller, if the first arm switch assembly is in the armed position or the safe position based on the arm switch position signal.

In various embodiments, the first arm switch assembly may comprise a lever and a sensor. Determining, by the controller, the position of the first arm switch assembly may comprise receiving, by the controller, a signal from the sensor; and determining, by the controller, if the first arm switch assembly is in the armed position or the safe position based on the signal from the sensor.

An article of manufacture including a tangible, non-transitory computer-readable storage medium having instructions stored thereon for monitoring an ejection mode selection of an ejection system is also disclosed herein. In accordance with various embodiments, the instructions, in response to execution by a controller, cause the controller to perform operations which may comprise determining, by the controller, an ejection mode of the ejection system; determining, by the controller, a position of a first arm switch assembly of a first ejection seat; determining, by the controller, a position of a second arm switch assembly of a second ejection seat; and commanding, by the controller, a display to output at least one of a fault-free signal, a fault signal, or a warning signal based on the ejection mode, the position of the first arm switch assembly, and the position of the second arm switch assembly.

In various embodiments, determining, by the controller, the ejection mode of the ejection system may comprise receiving, by the controller, a signal from an ejection mode selector; and determining, by the controller, the ejection mode based on the signal. The ejection mode may comprise at least one of a solo mode, a dual mode, or a pilot command mode.

In various embodiments, determining, by the controller, the position of the first arm switch assembly may comprise determining, by the controller, if the first arm switch assembly is in an armed position or a safe position. Determining, by the controller, the position of the second arm switch assembly may comprise determining, by the controller, if the second arm switch assembly is in the armed position or the safe position.

In various embodiments, the controller may be configured to command a first indicator of the display to output the fault-free signal in response to the controller determining the ejection mode is the solo mode, the first arm switch assembly is in the armed position, and the second arm switch assembly is in the safe position. The controller may be configured to command the first indicator of the display to output the fault signal in response to the controller determining the ejection mode is the solo mode and at least one of the first arm switch assembly is in the safe position or the second arm switch assembly is in the armed position.

In various embodiments, the controller may be configured to command a second indicator of the display to output the warning signal in response to the controller determining the ejection mode is the dual mode, the first arm switch assembly is in the armed position, and the second arm switch assembly is in the armed position. The controller may be configured to command the second indicator of the display to output the fault signal in response to the controller determining the ejection mode is the dual mode and at least one of the first arm switch assembly or the second arm switch assembly is in the safe position.

In various embodiments, the controller may be configured to command a third indicator of the display to output the warning signal in response to the controller determining the ejection mode is the pilot command mode, the first arm switch assembly is in the armed position, and the second arm switch assembly is in the armed position. The controller may be configured to command the third indicator of the display to output the fault signal in response to the controller determining the ejection mode is the pilot command mode and at least one of the first arm switch assembly or the second arm switch assembly is in the safe position.

A method for monitoring an ejection mode selection for an ejection system is also disclosed herein. In accordance with various embodiments, the method may comprise determining, by a controller, an ejection mode of the ejection system; and determining, by the controller, a position of a first arm switch assembly of a first ejection seat. The position of the first arm switch assembly may be at least one of an armed position or a safe position. The method may further comprise determining, by the controller, a position of a second arm switch assembly of a second ejection seat, the position of the second arm switch assembly may be at least one of the armed position or the safe position; and commanding, by the controller, a display to output at least one of a fault-free signal, a fault signal, or a warning signal based on the ejection mode, the position of the first arm switch assembly, and the position of the second arm switch assembly.

In various embodiments, determining, by the controller, the ejection mode of the ejection system may comprise receiving, by the controller, a signal from an ejection mode selector; and determining, by the controller, if the ejection mode is a solo mode, a dual mode, or a pilot command mode based on the signal from the ejection mode selector.

In various embodiments, commanding, by the controller, the display to output at least one of the fault-free signal, the fault signal, or the warning signal may comprise at least one of commanding, by the controller, an indicator of the display to output the fault-free signal in response to the controller determining the ejection mode is the solo mode, the first arm switch assembly is in the armed position, and the second arm switch assembly is in the safe position; or commanding, by the controller, the indicator of the display to output the fault signal in response to the controller determining the ejection mode is the solo mode and at least one of the first arm switch assembly is in the safe position or the second arm switch assembly is in the armed position.

In various embodiments, commanding, by the controller, the display to output at least one of the fault-free signal, the fault signal, or the warning signal may comprise at least one of commanding, by the controller, an indicator of the display to output the warning signal in response to the controller determining the ejection mode is the dual mode, the first arm switch assembly is in the armed position, and the second arm switch assembly is in the armed position; or commanding, by the controller, the indicator of the display to output the fault signal in response to the controller determining the ejection mode is the dual mode and at least one of the first arm switch assembly or the second arm switch assembly is in the safe position.

In various embodiments, commanding, by the controller, the display to output at least one of the fault-free signal, the fault signal, or the warning signal may comprise at least one of commanding, by the controller, an indicator of the display to output the warning signal in response to the controller determining the ejection mode is the pilot command mode, the first arm switch assembly is in the armed position, and the second arm switch assembly is in the armed position; or commanding, by the controller, the indicator of the display to output the fault signal in response to the controller determining the ejection mode is the pilot command mode and at least one of the first arm switch assembly or the second arm switch assembly is in the safe position.

In various embodiments, the method may further comprise at least one of commanding, by the controller, a first seat indicator of the display to output an armed signal in response to the controller determining the first arm switch assembly is in the armed position; commanding, by the controller, the first seat indicator of the display to output a safe signal in response to the controller determining the first arm switch assembly is in the safe position; commanding, by the controller, a second seat indicator of the display to output the armed signal in response to the controller determining the second arm switch assembly is in the armed position, or commanding, by the controller, the second seat indicator of the display to output the safe signal in response to the controller determining the second arm switch assembly is in the safe position.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

As used herein, the term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In re Nuijten to fall outside the scope of patentable subject matter under 35 U.S.C. § 101.

Disclosed herein is a dual arm switch and mode select system for an ejection system. The dual arm switch and mode select system is configured to determine which of the ejection seats are armed and whether the selected ejection mode agrees with the armed seat determination. In various embodiments, the dual arm switch and mode select system may send an alert if the selected ejection mode does not agree with the armed seat determination. For example, the dual arm switch and mode select system may send an alert if both the pilot seat and the co-pilot seat are armed, but a "solo" mode (i.e., eject pilot seat only mode) is selected. Similarly, an alert may be sent if the co-pilot seat is not armed, but a "both" mode (i.e., an ejection pilot seat and co-pilot seat) is selected. The dual arm switch and mode select system may also allow the flight crew to easily determine whether an initiation of the co-pilot ejection sequence will also initiate the pilot ejection sequence. In this regard, dual arm switch and mode select system can improve safety by decreasing the probability for incorrect ejection mode selection, thereby reducing the risk a crew member will not be ejected when he/she should be ejected or that a pilot will be inadvertently ejected.

Figure 1:
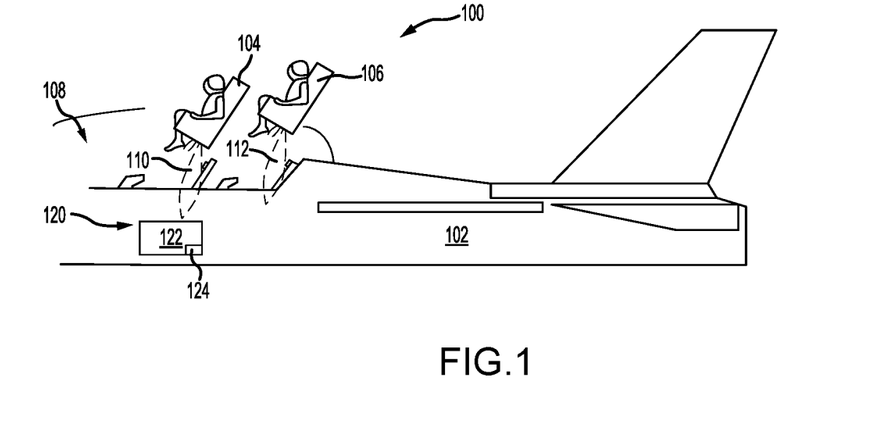
FIG. 1 illustrates ejection seats being launched from an aircraft cockpit, in accordance with various embodiments.

Referring now to FIG. 1, an aircraft ejection system 100 is shown, in accordance with various embodiments. Aircraft ejection system 100 may be installed in aircraft 102 to safely expel a pilot (or first) ejection seat 104 and a co-pilot (or second) ejection seat 106 from the cockpit 108 of aircraft 102. Pilot ejection seat 104 may be urged from cockpit 108 by a propulsion system 110. Co-pilot ejection seat 106 may be urged from cockpit 108 by a propulsion system 112. Aircraft 102 may be a passenger aircraft, a cargo aircraft, a military aircraft, or the like. As described in further detail below, ejection system 100 may include a dual arm switch and mode select (DASMS) system 120. DASMS system 120 may include a controller 122.

Controller 122 may include one or more logic devices such as one or more of a central processing unit (CPU), an accelerated processing unit (APU), a digital signal processor (DSP), a field programmable gate array (FPGA), an application specific integrated circuit (ASIC), or the like. Controller 122 further includes any tangible, non-transitory computer-readable storage medium 124 known in the art. The storage medium 124 has instructions stored thereon that, in response to execution by controller 122, cause controller 122 to perform various operations for determining if a correct ejection mode is selected. In this regard, controller 122 is configured to determine which of pilot ejection seat 104 and co-pilot ejection seat 106 are armed and if the ejection mode (i.e., the current ejection mode) of ejection system 100 is congruous with armed seat determination.

Figure 2:
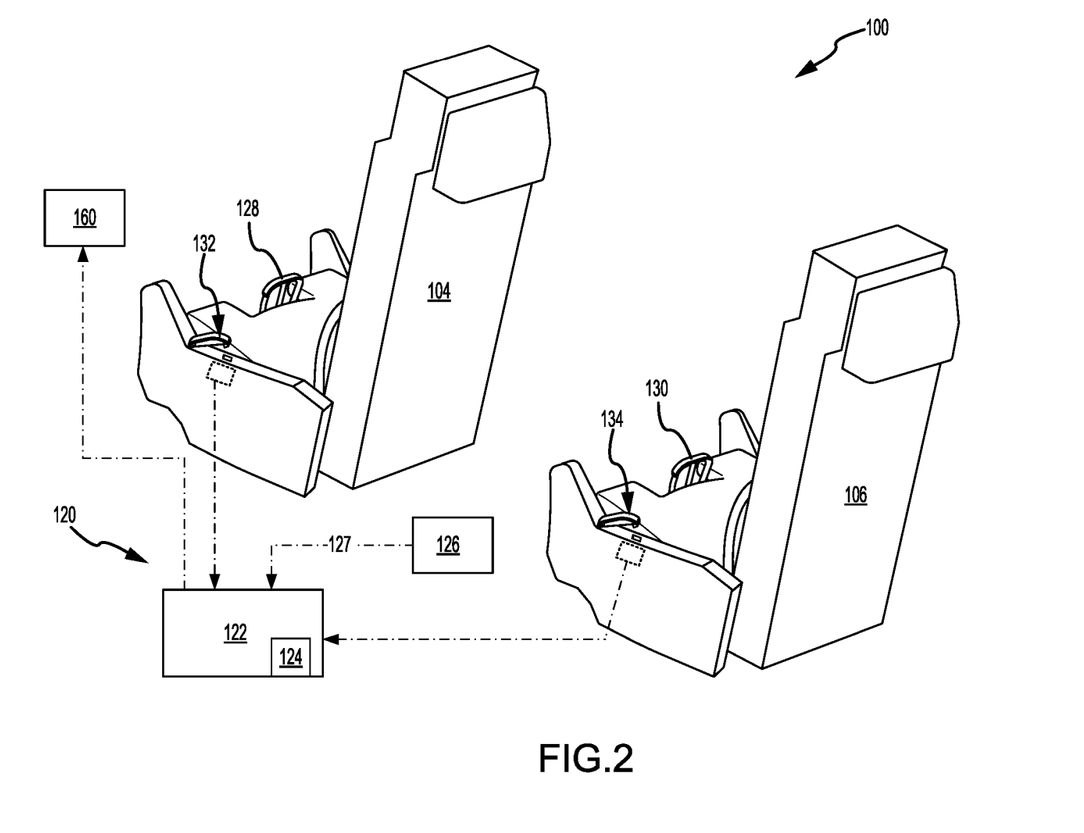
FIG. 2 illustrates an ejection system including a dual switch arm and mode select system, in accordance with various embodiments.

With reference to FIG. 2, additional details of DASMS system 120 of ejection system 100 are illustrated. In accordance with various embodiments, controller 122 is in communication (wired communication or wireless communication) with an ejection mode selector 126 of ejection system 100. Ejection mode selector 126 is configured to allow a crew member of aircraft 102 to manually select an ejection mode for ejection system 100. In this regard, ejection mode selector 126 may send a signal 127 to controller 122 indicative of the current ejection mode for ejection system 100. Stated differently, controller 122 may determine the ejection mode of ejection system 100 based the signal 127 received from ejection mode selector 126.

In various embodiments, ejection mode selector 126 may allow the crew members to select between a "solo ejection mode," a "dual ejection mode," and a "pilot command mode." In accordance with various embodiments, solo ejection mode is configured such that initiation of an ejection sequence by pilot ejection seat 104 (e.g., actuation of pilot (or first) ejection handle 128) causes expulsion of only pilot ejection seat 104. Stated differently, when solo ejection mode is selected, actuation of pilot ejection handle 128 does not cause co-pilot ejection seat 106 to deploy. Dual ejection mode is configured such that initiation of an ejection sequence by either pilot ejection seat 104 or co-pilot ejection seat 106 (e.g., actuation of either pilot ejection handle 128 or a co-pilot (or second) ejection handle 130) causes expulsion of both pilot ejection seat 104 and co-pilot ejection seat 106. Pilot command mode is configured such that initiation of an ejection sequence by pilot ejection seat 104 (e.g., actuation of pilot ejection handle 128) causes expulsion of both pilot ejection seat 104 and co-pilot ejection seat 106, while initiation of an ejection sequence by co-pilot ejection seat 106 (e.g., actuation of co-pilot ejection handle 130) causes expulsion of only co-pilot ejection seat 106. In this regard, when pilot command mode is selected, actuation of co-pilot ejection handle 130 does not cause pilot ejection seat 104 to deploy. Ejection mode selector 126 may be a knob, push button(s), switch, touch screen, or any other component capable of allowing a crew member to select one of solo ejection mode, dual ejection mode, or pilot command ejection mode.

Controller 122 is also in communication with a pilot (or first) arm switch assembly 132 located on pilot ejection seat 104, and a co-pilot (or second) arm switch assembly 134 located on co-pilot ejection seat 106. In accordance with various embodiments, each of pilot arm switch assembly 132 and co-pilot arm switch assembly 134 are configured to translate between a "safe position" and an "armed position". In FIG. 2, both pilot arm switch assembly 132 and co-pilot arm switch assembly 134 are shown in the safe position. In the safe position, the ejection seat cannot initiate an ejection sequence. For example, and as described in further detail below, when pilot arm switch assembly 132 is in the safe position, a mechanical lockout assembly operably coupled between pilot arm switch assembly 132 and pilot ejection handle 128 blocks, or otherwise prevents, actuation of pilot ejection handle 128, such that pilot ejection handle 128 will not be able to initiate an ejection sequence for either pilot ejection seat 104 or co-pilot ejection seat 106. Similarly, when co-pilot arm switch assembly 134 is in the safe position, a mechanical lockout assembly operably coupled between co-pilot arm switch assembly 134 and co-pilot ejection handle 130 blocks, or otherwise prevents, actuation of co-pilot ejection handle 130, such that co-pilot ejection handle 130 will not be able to initiate an ejection sequence for either co-pilot ejection seat 106 or pilot ejection seat 104. In the armed position, the ejection seat can initiate the selected ejection mode. For example, when pilot arm switch assembly 132 is in the armed position actuation of pilot ejection handle 128 will initiate an ejection sequence for pilot ejection seat 104 and, if dual ejection mode or pilot command ejection mode is selected, for co-pilot ejection seat 106. Similarly, when co-pilot arm switch assembly 134 is in the armed position, actuation of co-pilot ejection handle 130 will initiate an ejection sequence for co-pilot ejection seat 106 and, if dual ejection mode is selected, for pilot ejection seat 104.

Figure 3A:
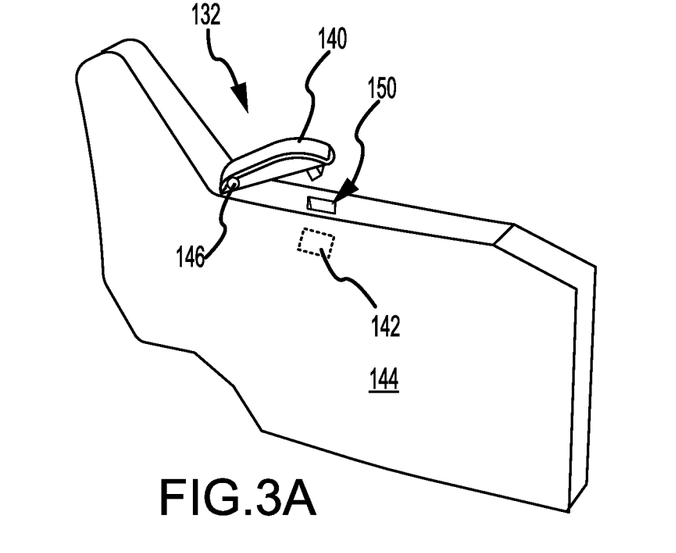
FIGS. 3A and 3B illustrate an arm switch assembly in a safe position, in accordance with various embodiments.
Figure 3B:
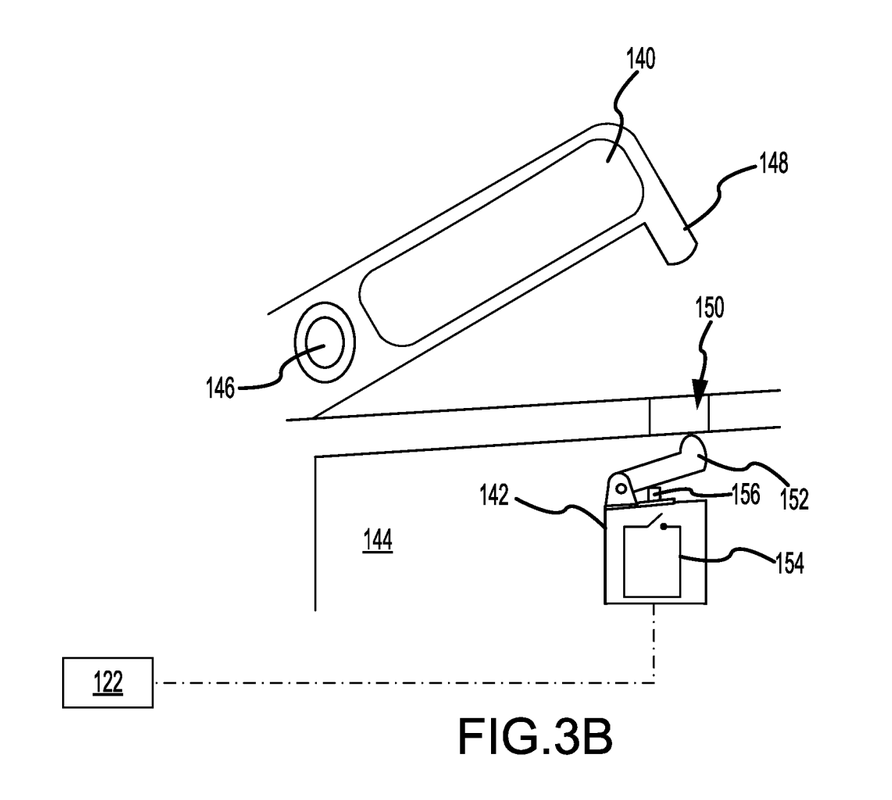

With reference to FIGS. 3A and 3B, pilot arm switch assembly 132 is illustrated in the safe position. While FIGS. 3A, 3B, 4A, 4B, 5A and 5B illustrate details of pilot arm switch assembly 132, it is contemplated and understood that co-pilot arm switch assembly, in FIG. 2, includes the features and functionalities as described herein with reference to pilot arm switch assembly 132. Pilot arm switch assembly 132 includes a lever 140 and a circuit assembly 142. In various embodiments, circuit assembly 142 may be located within a side panel 144 of pilot ejection seat 104. Lever 140 may be configured to rotate about a pivot joint 146. Lever 140 may include a protrusion 148. In the safe position, protrusion 148 may be located outside (e.g., above) an opening 150 defined by side panel 144. Controller 122 is in communication with circuit assembly 142. Controller 122 is configured to determine if pilot arm switch assembly 132 is in the safe position or the armed position based on an arm switch position signal received from circuit assembly 142. For example, in various embodiments, in the safe position, a circuit 154 of circuit assembly may be in an open state such that no signal (or a signal indicative of pilot arm switch assembly 132 being in the position) is provided to controller 122. The lack of signal indicates to controller 122 that pilot arm switch assembly 132 is in the safe position.

Figure 4A:
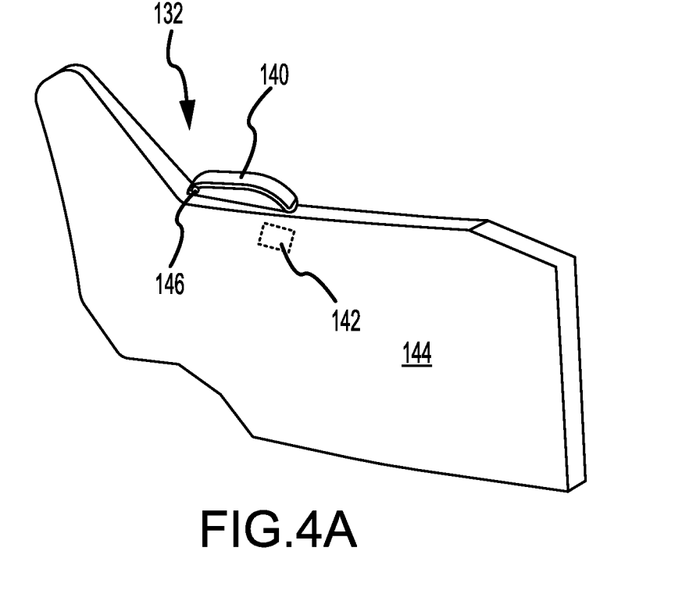
FIGS. 4A and 4B illustrate the arm switch assembly in an armed position, in accordance with various embodiments.
Figure 4B:
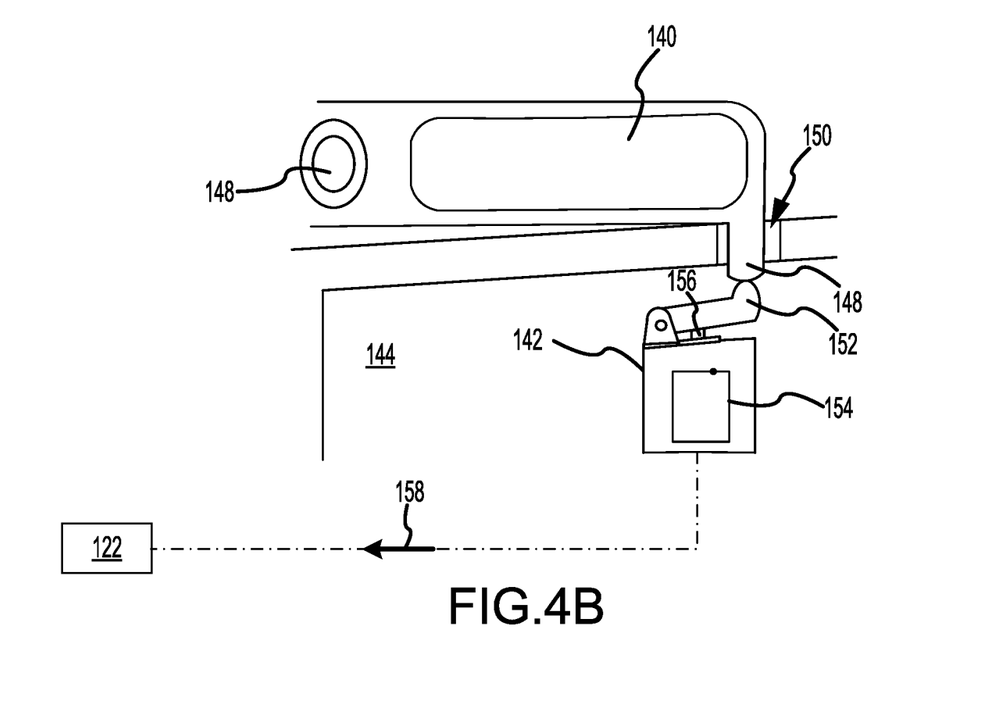

With additional reference to FIGS. 4A and 4B, pilot arm switch assembly 132 is illustrated in the armed position. In accordance with various embodiments, rotation of lever 140 about pivot joint 146 is configured to cause protrusion 148 to translate through opening 150 in side panel 144 and into contact with an arm 152 of circuit assembly 142. Rotation of lever 140 may cause protrusion 148 to force arm 152 towards a switch 156 of circuit assembly 142. In this regard, rotating protrusion 148 into opening 150 may cause arm 152 to actuate switch 156. Actuation of switch 156 may close circuit 154, or otherwise cause circuit assembly 142 to output arm switch position signal 158 indicative of pilot arm switch assembly 132 being in the armed position. In response to receiving arm switch position signal 158 from circuit assembly 142, controller 122 may determine that pilot arm switch assembly 132 is in the armed position.

While circuit 154 is described as being in the open state when pilot arm switch assembly 132 is in the safe position and in the closed state when pilot arm switch assembly 132 is in the safe position, it is further contemplated and understood that, in various embodiments, in the armed position, circuit 154 may be in the open state and the lack of signal indicates to controller 122 that pilot arm switch assembly 132 is in the armed position. Additionally, a signal frequency, magnitude, or any other type of signal conditioning may be employed to allow controller 122 to determine if pilot arm switch assembly 132 is in the safe position or the armed position.

Figure 5A:
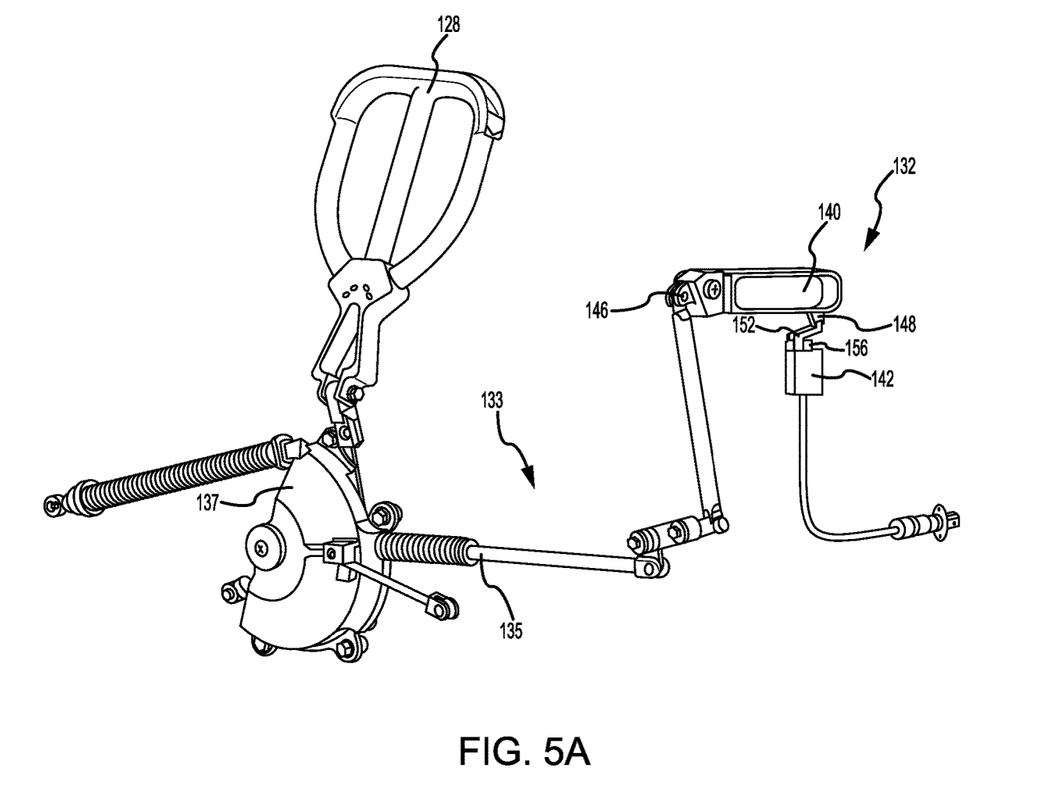
FIG. 5A illustrates a mechanical lockout assembly coupled between an arm switch assembly and a pilot ejection handle, in accordance with various embodiments.

With additional reference to FIGS. 5A, in various embodiments, a mechanical lockout assembly 133 is operably coupled between pilot arm switch assembly 132 and pilot ejection handle 128. Rotation of lever 140 is configured to actuate a lock pin 135 of mechanical lockout assembly 133. When pilot arm switch assembly 132 is in the safe position, lock pin 135 blocks actuation of pilot ejection handle 128. For example, when pilot arm switch assembly 132 is in the safe position, lock pin 135 may be located within a bell crank 137 of mechanical lockout assembly 133. In the safe position, lock pin 135 blocks (i.e., generates an interference that prevents) rotation of bell crank 137. Bell crank 137 is coupled to pilot ejection handle 128 such that blocking rotation of bell crank 137 prevents actuation of pilot ejection handle 128. Mechanical lockout assembly 133 is configured such that lock pin 135 translates out of bell crank 137 (i.e., the interference between lock pin 135 and bell crank 137 is removed) in response to translation of lever 140 from the safe position to the armed position. In this regard, when pilot arm switch assembly 132 is in the armed position, bell crank 137 is free to rotate, thereby allowing actuation of pilot ejection handle 128 to initiate the ejection sequence.

Figure 5B:
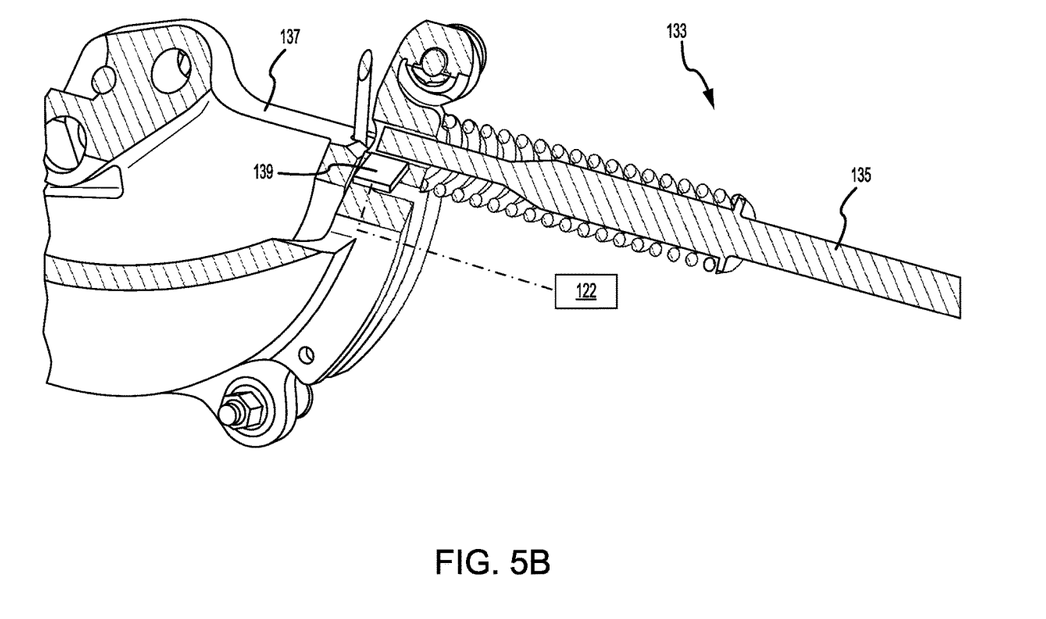
FIG. 5B illustrates a cross-sectional view of a mechanical lockout assembly, in accordance with various embodiments.

With reference to FIG. 5B, in various embodiments, pilot arm switch assembly 132 may include a sensor 139. Sensor 139 is configured to detect a position of lock pin 135. In various embodiments, sensor 139 may be located on, or in, bell crank 137. Sensor 139 is in communication with controller 122. In this regard, controller 122 may receive signals, indicative of the position of lock pin 135, output from sensor 139. Controller 122 may determine if pilot arm switch assembly 132 is in the safe position or the armed position based on the signals received from sensor 139. Stated differently, controller 122 may determine if pilot arm switch assembly 132 is in the safe position or the armed position based on the position of lock pin 135. In various embodiments, pilot arm switch assembly 132 may include sensor 139 in place of circuit assembly 142 (i.e., sensor 139 may allow circuit assembly 142 to be eliminated from pilot arm switch assembly 132).

Returning to FIG. 2, controller 122 may be in communication with a display 160. Display 160 may be configured to indicate to the occupant of pilot ejection seat 104 and/or to the occupant of co-pilot ejection seat 106 which ejection seats are armed and which ejection mode is selected. For example, and with additional reference to FIG. 5, display 160 may include an seat indicator section 162 and a mode indicator section 164.

Figure 6:
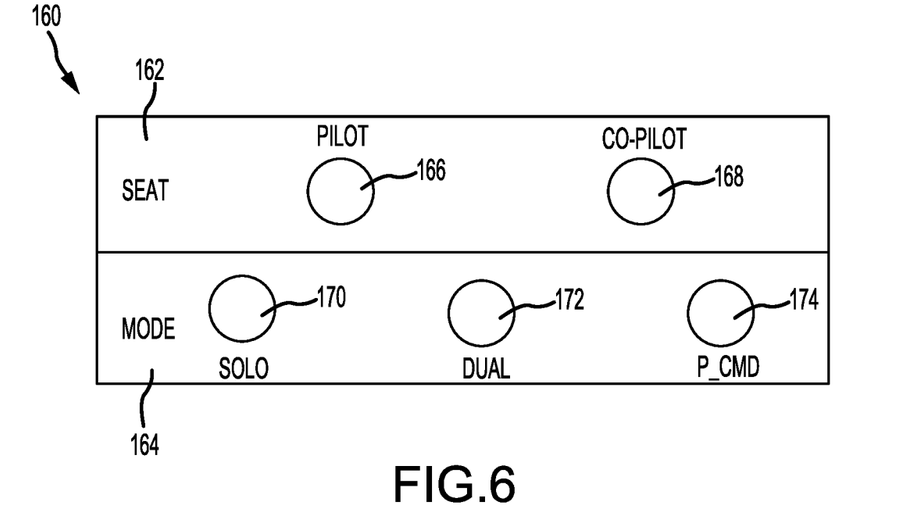
FIG. 6 illustrates a display of a dual switch arm and mode select system, in accordance with various embodiments.

Seat indicator section 162 may include a pilot seat (or first seat) indicator 166 and a co-pilot seat (or second seat) indicator 168. Controller 122 may send commands to pilot seat indicator 166 and co-pilot seat indicator 168 based on the signals (or lack of signals) received from pilot arm switch assembly 132 and co-pilot arm switch assembly 134, respectively. The commands received from controller 122 may cause pilot seat indicator 166 and co-pilot seat indicator 168 to output a light, display a symbol, output a visual message, output an audio message, and/or output any indictor configured to convey the position of pilot arm switch assembly 132 and co-pilot arm switch assembly 134. In this regard, display 160 may include an analog display, a digital display, a head-up display, smart glass, an audio alert system, and/or any other system capable of indicating to a crew member which ejection seat(s) is/are in the armed position, which ejection seat(s) is/are in the safe position, and which ejection mode is selected.

In various embodiments, controller 122 may be configured to command pilot seat indicator 166 to output an armed signal, in response to controller 122 determining pilot arm switch assembly 132 is in the armed position. Similarly, controller 122 may command co-pilot seat indicator 168 to output the armed signal, in response to controller 122 determining co-pilot arm switch assembly 134 is in the armed position. For example, in various embodiments, pilot seat indicator 166 and co-pilot seat indicator 168 may each comprise a light emitting diode (LED). Controller 122 may cause the LED of pilot seat indicator 166 to emit light (i.e. be powered on) in response to controller 122 determining pilot arm switch assembly 132 is in the armed position and to not emit light (i.e., be powered off) in response to controller 122 determining pilot arm switch assembly 132 is in the safe position. Controller 122 may cause the LED of co-pilot seat indicator 168 to emit light (i.e. be powered on) in response to controller 122 determining co-pilot arm switch assembly 134 is in the armed position and to not emit light (i.e., be powered off) in response to controller 122 determining co-pilot arm switch assembly 134 is in the safe position. In various embodiments, controller 122 may cause the LEDs of pilot seat indicator 166 and co-pilot seat indicator 168 to not emit light (i.e. be powered off) in response to determining pilot arm switch assembly 132 and co-pilot arm switch assembly 134, respectively, are in the armed position and to emit light (i.e., be powered on) in response to determining pilot arm switch assembly 132 and co-pilot arm switch assembly 134, respectively, are in the safe position.

Mode indicator section 164 of display 160 may include a solo mode (or first) indicator 170, a dual mode (or second) indicator 172, and a pilot command (P_CMD) (or third) mode indicator 174. Controller 122 may send commands to solo mode indicator 170, dual mode indicator 172, or P_CMD mode indicator 174 based on the signal 127 received from ejection mode selector 126 and the positions of pilot arm switch assembly 132 and co-pilot arm switch assembly 134. The commands received from controller 122 may cause solo mode indicator 170, dual mode indicator 172, or P_CMD mode indicator 174 to light up, display a symbol, output a message, or the like. In various embodiments, display 160 may be configured such that only one of solo mode indicator 170, dual mode indicator 172, or P_CMD mode indicator 174 is illuminated at a time.

In accordance with various embodiments, controller 122 may command solo mode indicator 170, dual mode indicator 172, or P_CMD mode indicator 174 do display a fault-free signal (e.g., a first color light, a first symbol, first message, etc.) if controller 122 determines the selected mode is congruous with the positions of pilot arm switch assembly 132 and co-pilot arm switch assembly 134. Controller 122 may command solo mode indicator 170, dual mode indicator 172, or P_CMD mode indicator 174 to display a fault signal (e.g., a second color light, a second symbol, second message, etc.) different from the fault-free signal if controller 122 determines the selected mode is not in agreement with the positions of pilot arm switch assembly 132 and co-pilot arm switch assembly 134. Controller 122 may command solo mode indicator 170, dual mode indicator 172, or P_CMD mode indicator 174 to display a warning signal (e.g., a third color light, a third symbol, third message, etc.) different from the fault-free signal and the fault signal if controller 122 determines the currently selected ejection mode may be correct based on the position of pilot arm switch assembly 132 and the position of co-pilot arm switch assembly 134.

For example, in accordance with various embodiments, if controller 122 determines solo mode is selected, pilot arm switch assembly 132 is in the armed position, and co-pilot arm switch assembly 134 is in the safe position, controller 122 commands solo mode indicator 170 to display a fault-free signal, for example, a green light or other message, configured to convey to the pilot that the current ejection mode is correct based on the current positions of pilot arm switch assembly 132 and co-pilot arm switch assembly 134. Stated differently, controller 122 commands solo mode indicator 170 to display the fault-free signal if solo mode is in agreement with the position of pilot arm switch assembly 132 and the position of co-pilot arm switch assembly 134.

If controller 122 determines solo mode is selected and pilot arm switch assembly 132 is in the safe position or co-pilot arm switch assembly 134 is in the armed position, controller 122 commands solo mode indicator 170 to display a fault signal, for example, a red light or other message, configured to covey to the pilot or other crew members that the current ejection mode is not in agreement with one or more arm switch positions. Stated differently, controller 122 commands solo mode indicator 170 to display the fault signal if solo mode (i.e., the current ejection mode) is not in agreement with the position of pilot arm switch assembly 132 and/or the position of co-pilot arm switch assembly 134. In various embodiments, controller 122 may also command display 160 to output an audio alert in response to determining the current ejection mode is not in agreement with the position of pilot arm switch assembly 132 and/or the position of co-pilot arm switch assembly 134.

In various embodiments, if controller 122 determines dual mode is selected, pilot arm switch assembly 132 is in the armed position, and co-pilot arm switch assembly 134 is in the armed position, controller 122 commands dual mode indicator 172 to output a warning signal, for example, a yellow light or other message, configured to convey to the pilot or other crew members that the current ejection mode should be confirmed. In this regard, the warning signal indicates that the current ejection mode may be correct, but that the pilot should confirm. For example, if a trainee or other person to which the pilot does not want to grant control of pilot ejection seat 104 is occupying co-pilot ejection seat 106, co-pilot arm switch assembly 134 should be armed, but pilot command mode should be selected. Thus, in response to dual mode indicator 172 outputting the warning signal, the pilot can change the ejection mode to pilot command mode, if he/she so desires.

If controller 122 determines dual mode is selected and either of pilot arm switch assembly 132 or co-pilot arm switch assembly 134 is in the safe position, controller 122 commands dual mode indicator 172 to display a fault alert, for example, a red light or other message, configured to covey to the pilot or other crew members that the current ejection mode is not in agreement with at least one of the position of pilot arm switch assembly 132 and/or the position of co-pilot arm switch assembly 134.

In various embodiments, if controller 122 determines pilot command mode is selected, pilot arm switch assembly 132 is in the armed position, and co-pilot arm switch assembly 134 is in the armed position, controller 122 commands P_CMD mode indicator 174 to output a warning signal, for example, a yellow light or other message, configured to convey to the pilot or other crew members that the current ejection mode should be confirmed. In this regard, the warning signal indicates that the current ejection mode may be correct, but that the pilot should confirm. For example, if a co-pilot or other person to which the pilot wants to grant control of pilot ejection seat 104 is occupying co-pilot ejection seat 106, dual mode should be selected. Thus, in response to P_CMD mode indicator 174 outputting the warning signal, the pilot can change the ejection mode to dual mode, if he/she so desires.

If controller 122 determines pilot command mode is selected and either of pilot arm switch assembly 132 or co-pilot arm switch assembly 134 is in the safe position, controller 122 commands P_CMD mode indicator 174 to display a fault alert, for example, a red light or other message, configured to covey to the pilot or other crew members that the current ejection mode is not in agreement with at least one of the position of pilot arm switch assembly 132 and/or the position of co-pilot arm switch assembly 134.

DASMS system 120 allows the pilot and/or crew member(s) to quickly determine if a fault exists, the cause of the fault, and what is needed to correct the fault by viewing which indicators in seat indicator section 162 and mode indicator section 164 of display 160 are illuminated. For example, if co-pilot ejection seat 106 is occupied, but co-pilot seat indicator 168 is not illuminated, the pilot and/or crew members can quickly determine that dual mode indicator 172 is outputting a fault signal because co-pilot arm switch assembly 134 is not in the armed position.

Figure 7A:
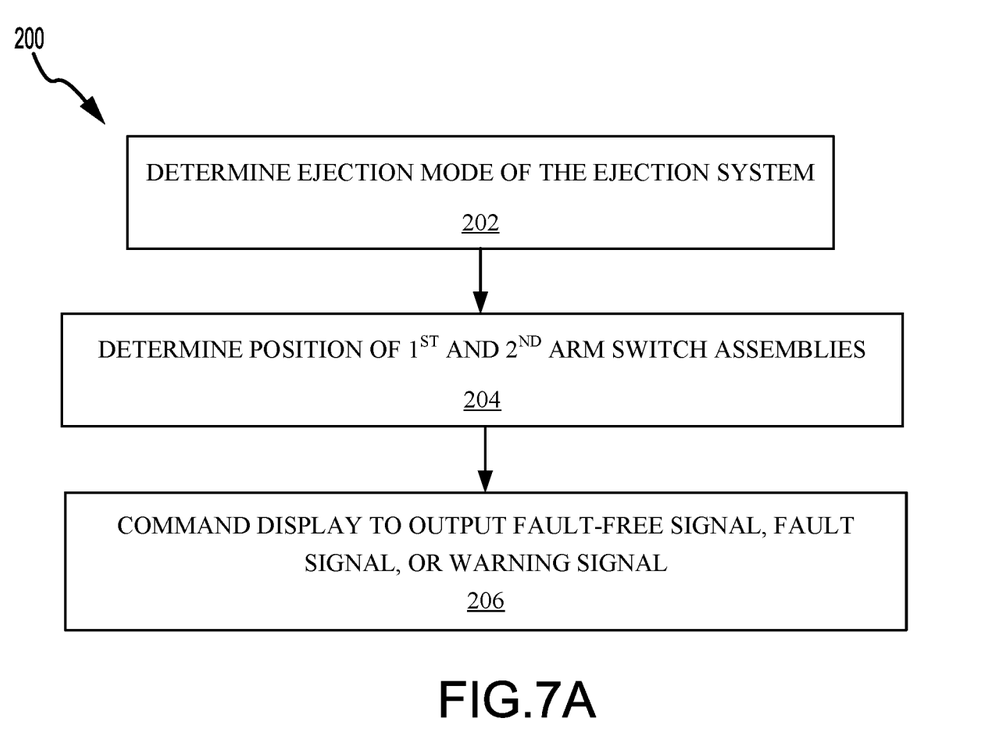
FIGS. 7A and 7B illustrate a method for monitoring an ejection mode selection of an ejection system, in accordance with various embodiments.

With reference to FIG. 7A, a method 200 for monitoring an ejection mode selection for an ejection system is illustrated. In accordance with various embodiments, the steps of method 200 may be carried out by controller 122 and DASMS system 120 (FIG. 2). Method 200 may comprise determining, by a controller, an ejection mode of the ejection system (step 202) and determining, by the controller, a position of a first arm switch assembly of a first ejection seat and a position of a second arm switch assembly of a second ejection seat (step 204). Method 200 may further include commanding, by the controller, a display to output at least one of a fault-free signal, a fault signal, or a warning signal based on the ejection mode, the position of the first arm switch assembly, and the position of the second arm switch assembly. In accordance with various embodiments, the position of the first arm switch assembly and the position of the second arm switch assembly may each be at least one of an armed position or a safe position.

With combined reference to FIG. 2 and FIG. 7A, in accordance with various embodiments, step 202 may include determining, by controller 122, an ejection mode of ejection system 100. Step 204 may include determining, by controller 122, a position of pilot arm switch assembly 132 of pilot ejection seat 104 and a position of co-pilot arm switch assembly 134 of co-pilot ejection seat 106. Step 206 may include commanding, by controller, display 160 to output at least one of a fault-free signal, a fault signal, or a warning signal based on the ejection mode, the position of pilot arm switch assembly 132, and the position of co-pilot arm switch assembly 134.

Figure 7B:
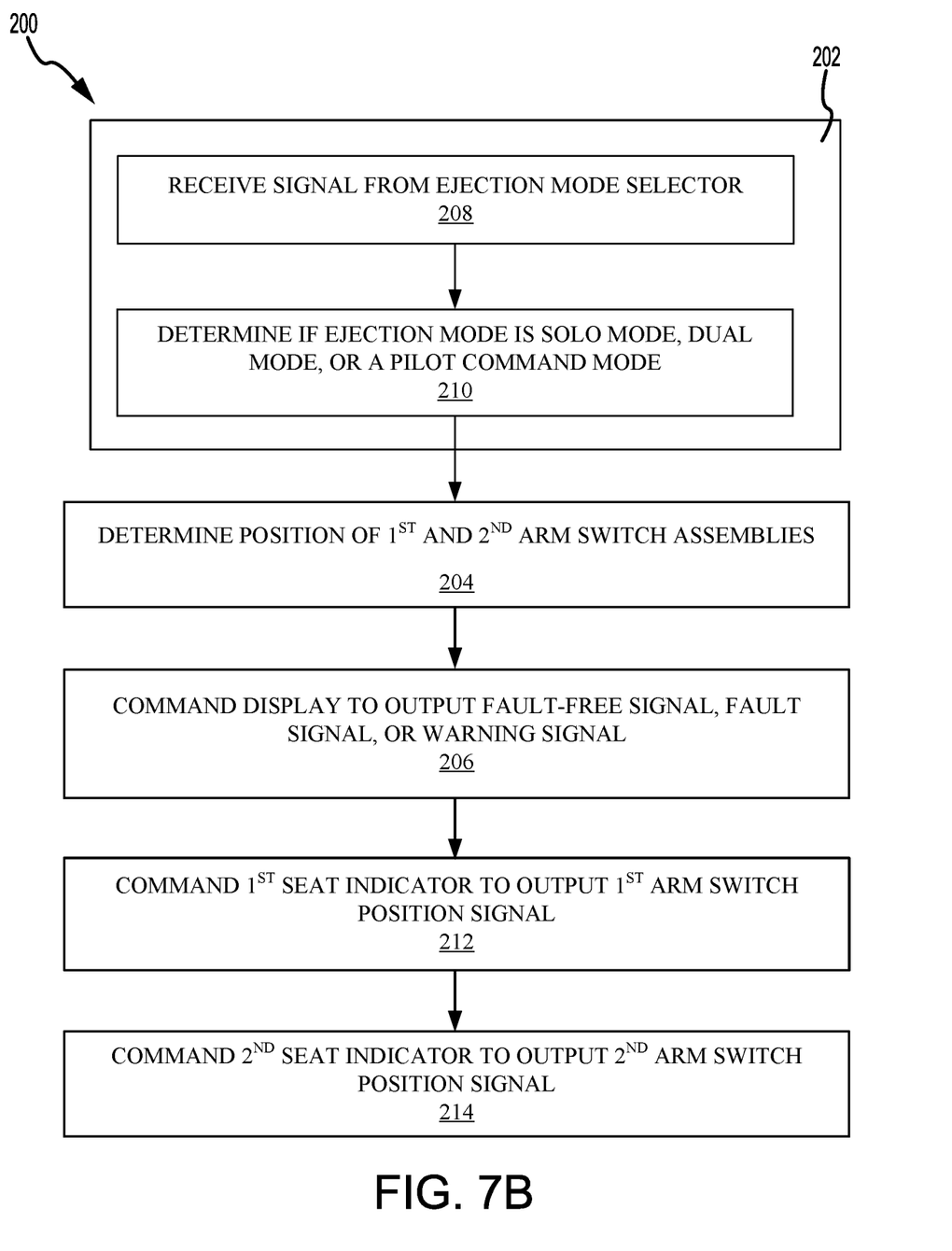

With additional reference to FIG. 7B, in various embodiments, step 202 may comprise receiving, by the controller, a signal from an ejection mode selector (step 208) and determining, by the controller, if the ejection mode is a solo mode, a dual mode, or a pilot command mode based on the signal from the ejection mode selector (step 210).

With combined reference to FIG. 2 and FIG. 7B, in accordance with various embodiments, step 208 may include receiving, by controller 122, signal 127 from ejection mode selector 126. Step 210 may include and determining, by controller 122, if the ejection mode is a solo mode, a dual mode, or a pilot command mode based on signal 127 from ejection mode selector 126.

With combined reference to FIG. 2, FIG. 6 and FIG. 7B, in various embodiments, step 206 may include commanding, by controller 122, an indicator (e.g., solo mode indicator 170) of display 160 to output the fault-free signal in response to controller 122 determining the ejection mode is the solo mode, the pilot arm switch assembly 132 is in the armed position, and the co-pilot arm switch assembly 134 is in the safe position. In various embodiments, step 206 may include commanding, by controller 122, an indicator (e.g., solo mode indicator 170) of display 160 to output the fault signal in response to controller 122 determining the ejection mode is the solo mode and at least one of pilot arm switch assembly 132 is in the safe position or co-pilot arm switch assembly 134 is in the armed position.

In various embodiments, step 206 may include commanding, by controller 122, an indicator (e.g., dual mode indicator 172) of display 160 to output the warning signal in response to controller 122 determining the ejection mode is the dual mode, the pilot arm switch assembly 132 is in the armed position, and co-pilot arm switch assembly 134 is in the armed position. In various embodiments, step 206 may include commanding, by controller 122, an indicator (e.g., dual mode indicator 172) of display 160 to output the fault signal in response to controller 122 determining the ejection mode is the dual mode and at least one of pilot arm switch assembly 132 or co-pilot arm switch assembly 134 is in the safe position.

In various embodiments, step 206 may include commanding, by controller 122, an indicator (e.g., P_CMD mode indicator 174) of display 160 to output the warning signal in response to controller 122 determining the ejection mode is the pilot command mode, pilot arm switch assembly 132 is in the armed position, and co-pilot arm switch assembly 134 is in the armed position. In various embodiments, step 206 may include commanding, by controller 122, an indicator (e.g., P_CMD mode indicator 174) of display 160 to output the fault signal in response to controller 122 determining the ejection mode is the pilot command mode and at least one of pilot arm switch assembly 132 or co-pilot arm switch assembly is in the safe position.

With continued reference to FIG. 7B, in various embodiments, method 200 may further comprise commanding, by the controller, a first seat indictor of the display to output a first arm switch position signal based on the position of the first arm switch assembly (step 212), and commanding, by the controller, a second seat indictor of the display to output a second arm switch position signal based on the position of the second arm switch assembly (step 214).

With combined reference to FIG. 2, FIG. 6, and FIG. 7B, in various embodiments, step 212 may include commanding, by controller 122, pilot seat indicator 166 of display 160 to output an armed signal if controller 122 determines pilot arm switch assembly 132 is in the armed position or to output a safe signal if controller 122 determines pilot arm switch assembly 132 is in the safe position. In various embodiments, step 214 may include commanding, by controller 122, co-pilot seat indicator 168 of display 160 to output the armed signal in response to controller 122 determining co-pilot arm switch assembly 134 is in the armed position or to output the safe signal in response to controller 122 determining co-pilot arm switch assembly 134 is in the safe position.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods, and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A dual switch arm and mode select system for monitoring an ejection mode selection of an ejection system, the dual switch arm and mode select system comprising:
    a controller;
    an ejection mode selector in communication with the controller;
    a first arm switch assembly in communication with the controller, the first arm switch assembly being configured to translate between a safe position and an armed position;
    a second arm switch assembly in communication with the controller, the second arm switch assembly being configured to translate between the safe position and the armed position;
    a display in communication with the controller; and
    a tangible, non-transitory medium configured to communicate with the controller, the tangible, non-transitory medium having instructions stored thereon that, in response to execution by the controller, cause the controller to perform operations comprising:
        determining, by the controller, an ejection mode of the ejection system based on a signal received from the ejection mode selector;
        determining, by the controller, a position of the first arm switch assembly;
        determining, by the controller, a position of the second arm switch assembly; and
        commanding, by the controller, the display to output at least one of a fault-free signal, a fault signal, or a warning signal based on the ejection mode, the position of the first arm switch assembly, and the position of the second arm switch assembly.

2. The dual switch arm and mode select system of claim 1, wherein the ejection mode comprises at least one of a solo mode, a dual mode, or a pilot command mode.

3. The dual switch arm and mode select system of claim 2, wherein the controller is configured to command a first indicator of the display to output the fault-free signal in response to the controller determining the ejection mode is the solo mode, the first arm switch assembly is in the armed position, and the second arm switch assembly is in the safe position; and wherein the controller is configured to command the first indicator of the display to output the fault signal in response to the controller determining the ejection mode is the solo mode and at least one of the first arm switch assembly is in the safe position or the second arm switch assembly is in the armed position.

4. The dual switch arm and mode select system of claim 3, wherein the controller is configured to command a second indicator of the display to output the warning signal in response to the controller determining the ejection mode is the dual mode, the first arm switch assembly is in the armed position, and the second arm switch assembly is in the armed position; and wherein the controller is configured to command the second indicator of the display to output the fault signal in response to the controller determining the ejection mode is the dual mode and at least one of the first arm switch assembly or the second arm switch assembly is in the safe position.

5. The dual switch arm and mode select system of claim 4, wherein the controller is configured to command a third indicator of the display to output the warning signal in response to the controller determining the ejection mode is the pilot command mode, the first arm switch assembly is in the armed position, and the second arm switch assembly is in the armed position; and wherein the controller is configured to command the third indicator of the display to output the fault signal in response to the controller determining the ejection mode is the pilot command mode and at least one of the first arm switch assembly or the second arm switch assembly is in the safe position.

6. The dual switch arm and mode select system of claim 3, wherein the controller is configured to command a first seat indicator of the display to output an armed signal in response to the controller determining the first arm switch assembly is in the armed position; and wherein the controller is configured to command a second seat indicator of the display to output the armed signal in response to the controller determining the second arm switch assembly is in the armed position.

7. The dual switch arm and mode select system of claim 6, wherein the first arm switch assembly comprises a lever and a circuit assembly, the circuit assembly being configured to output an arm switch position signal to the controller; and wherein determining, by the controller, the position of the first arm switch assembly comprises:
    receiving, by the controller, the arm switch position signal, from the circuit assembly; and
    determining, by the controller, if the first arm switch assembly is in the armed position or the safe position based on the arm switch position signal.

8. The dual switch arm and mode select system of claim 6, wherein the first arm switch assembly comprises a lever and a sensor; and wherein determining, by the controller, the position of the first arm switch assembly comprises:
    receiving, by the controller, a signal from the sensor; and
    determining, by the controller, if the first arm switch assembly is in the armed position or the safe position based on the signal from the sensor.

9. An article of manufacture including a tangible, non-transitory computer-readable storage medium having instructions stored thereon for monitoring an ejection mode selection of an ejection system and that, in response to execution by a controller, cause the controller to perform operations comprising:

determining, by the controller, an ejection mode of the ejection system;
determining, by the controller, a position of a first arm switch assembly of a first ejection seat;
determining, by the controller, a position of a second arm switch assembly of a second ejection seat; and
commanding, by the controller, a display to output at least one of a fault-free signal, a fault signal, or a warning signal based on the ejection mode, the position of the first arm switch assembly, and the position of the second arm switch assembly.

10. The article of claim 9, wherein determining, by the controller, the ejection mode of the ejection system comprises:
    receiving, by the controller, a signal from an ejection mode selector; and
    determining, by the controller, the ejection mode based on the signal, the ejection mode comprising at least one of a solo mode, a dual mode, or a pilot command mode.

11. The article of claim 10, wherein determining, by the controller, the position of the first arm switch assembly comprises determining, by the controller, if the first arm switch assembly is in an armed position or a safe position; and wherein determining, by the controller, the position of the second arm switch assembly comprises determining, by the controller, if the second arm switch assembly is in the armed position or the safe position.

12. The article of claim 11, wherein the controller is configured to command a first indicator of the display to output the fault-free signal in response to the controller determining the ejection mode is the solo mode, the first arm switch assembly is in the armed position, and the second arm switch assembly is in the safe position; and wherein the controller is configured to command the first indicator of the display to output the fault signal in response to the controller determining the ejection mode is the solo mode and at least one of the first arm switch assembly is in the safe position or the second arm switch assembly is in the armed position.

13. The article of claim 12, wherein the controller is configured to command a second indicator of the display to output the warning signal in response to the controller determining the ejection mode is the dual mode, the first arm switch assembly is in the armed position, and the second arm switch assembly is in the armed position; and wherein the controller is configured to command the second indicator of the display to output the fault signal in response to the controller determining the ejection mode is the dual mode and at least one of the first arm switch assembly or the second arm switch assembly is in the safe position.

14. The article of claim 12, wherein the controller is configured to command a third indicator of the display to output the warning signal in response to the controller determining the ejection mode is the pilot command mode, the first arm switch assembly is in the armed position, and the second arm switch assembly is in the armed position; and wherein the controller is configured to command the third indicator of the display to output the fault signal in response to the controller determining the ejection mode is the pilot command mode and at least one of the first arm switch assembly or the second arm switch assembly is in the safe position.

15. A method for monitoring an ejection mode selection for an ejection system, the method comprising:
- determining, by a controller, an ejection mode of the ejection system;
- determining, by the controller, a position of a first arm switch assembly of a first ejection seat, the position of the first arm switch assembly being at least one of an armed position or a safe position;
- determining, by the controller, a position of a second arm switch assembly of a second ejection seat, the position of the second arm switch assembly being at least one of the armed position or the safe position; and
- commanding, by the controller, a display to output at least one of a fault-free signal, a fault signal, or a warning signal based on the ejection mode, the position of the first arm switch assembly, and the position of the second arm switch assembly.

16. The method of claim 15, wherein determining, by the controller, the ejection mode of the ejection system comprises:
- receiving, by the controller, a signal from an ejection mode selector; and
- determining, by the controller, the ejection mode based on the signal, the ejection mode comprising at least one of a solo mode, a dual mode, or a pilot command mode based on the signal from the ejection mode selector.

17. The method of claim 16, wherein commanding, by the controller, the display to output at least one of the fault-free signal, the fault signal, or the warning signal comprises at least one of:
- commanding, by the controller, an indicator of the display to output the fault-free signal in response to the controller determining the ejection mode is the solo mode, the first arm switch assembly is in the armed position, and the second arm switch assembly is in the safe position; or
- commanding, by the controller, the indicator of the display to output the fault signal in response to the controller determining the ejection mode is the solo mode and at least one of the first arm switch assembly is in the safe position or the second arm switch assembly is in the armed position.

18. The method of claim 16, wherein commanding, by the controller, the display to output at least one of the fault-free signal, the fault signal, or the warning signal comprises at least one of:
- commanding, by the controller, an indicator of the display to output the warning signal in response to the controller determining the ejection mode is the dual mode, the first arm switch assembly is in the armed position, and the second arm switch assembly is in the armed position; or
- commanding, by the controller, the indicator of the display to output the fault signal in response to the controller determining the ejection mode is the dual mode and at least one of the first arm switch assembly or the second arm switch assembly is in the safe position.

19. The method of claim 16, wherein commanding, by the controller, the display to output at least one of the fault-free signal, the fault signal, or the warning signal comprises at least one of:
- commanding, by the controller, an indicator of the display to output the warning signal in response to the controller determining the ejection mode is the pilot command mode, the first arm switch assembly is in the armed position, and the second arm switch assembly is in the armed position; or
- commanding, by the controller, the indicator of the display to output the fault signal in response to the controller determining the ejection mode is the pilot command mode and at least one of the first arm switch assembly or the second arm switch assembly is in the safe position.

20. The method of claim 19, further comprising at least one of:
- commanding, by the controller, a first seat indicator of the display to output an armed signal in response to the controller determining the first arm switch assembly is in the armed position;
- commanding, by the controller, the first seat indicator of the display to output a safe signal in response to the controller determining the first arm switch assembly is in the safe position;
- commanding, by the controller, a second seat indicator of the display to output the armed signal in response to the controller determining the second arm switch assembly is in the armed position; or
- commanding, by the controller, the second seat indicator of the display to output the safe signal in response to the controller determining the second arm switch assembly is in the safe position.

* * * * *